United States Patent [19]

Jelks

[11] 4,053,645

[45] Oct. 11, 1977

[54] PROCESS OF INCREASING THE DIGESTABILITY OF CELLULOSIC MATERIAL USING NITRIC ACID

[76] Inventor: James W. Jelks, Route 1, Box 461, Sand Springs, Okla. 74063

[21] Appl. No.: 654,555

[22] Filed: Feb. 2, 1976

[51] Int. Cl.$^2$ ............................................... A23K 1/00
[52] U.S. Cl. ........................................ 426/53; 426/54; 426/60; 426/635
[58] Field of Search ........................... 426/2, 7, 52-54, 426/634, 635, 62, 561, 623, 442, 455, 805, 807; 127/36, 37; 195/33; 157/89, 96, 97

[56] References Cited

U.S. PATENT DOCUMENTS

| 1,092,221 | 4/1914 | Little | 426/635 |
| 1,816,135 | 7/1931 | Acree | 127/37 |
| 3,939,286 | 2/1976 | Jelks | 426/635 |

OTHER PUBLICATIONS

Rydholm "Pulping Processes", Lignin–Degradative Pulping Interscience Publishers 1965 pp. 673-677.

*Primary Examiner*—R. B. Penland
*Attorney, Agent, or Firm*—Head, Johnson & Chafin

[57] ABSTRACT

A process of treating cellulosic plant matter to increase the digestability thereof by animals, in which finely divided plant matter, such as sawdust, rice hulls, bagasse, wheat straw, or the like, is mixed with water and nitric acid or a combination of water, nitric acid and a nonoxidizing acid, such as sulfuric, phosphoric, hydrochloric or acetic, to produce a mixture of about 20% water, ¼ to 1% oxygen based on the oven dried weight of organic material, the oxygen being released from the nitric acid, and a pH of 0.5 to 3.5, and cooking the mixture in a pressurized vessel at about 125 psig for 30 to 60 minutes. The cooked product may then be neutralized to raise the pH to a desired level for animal feed.

15 Claims, 1 Drawing Figure

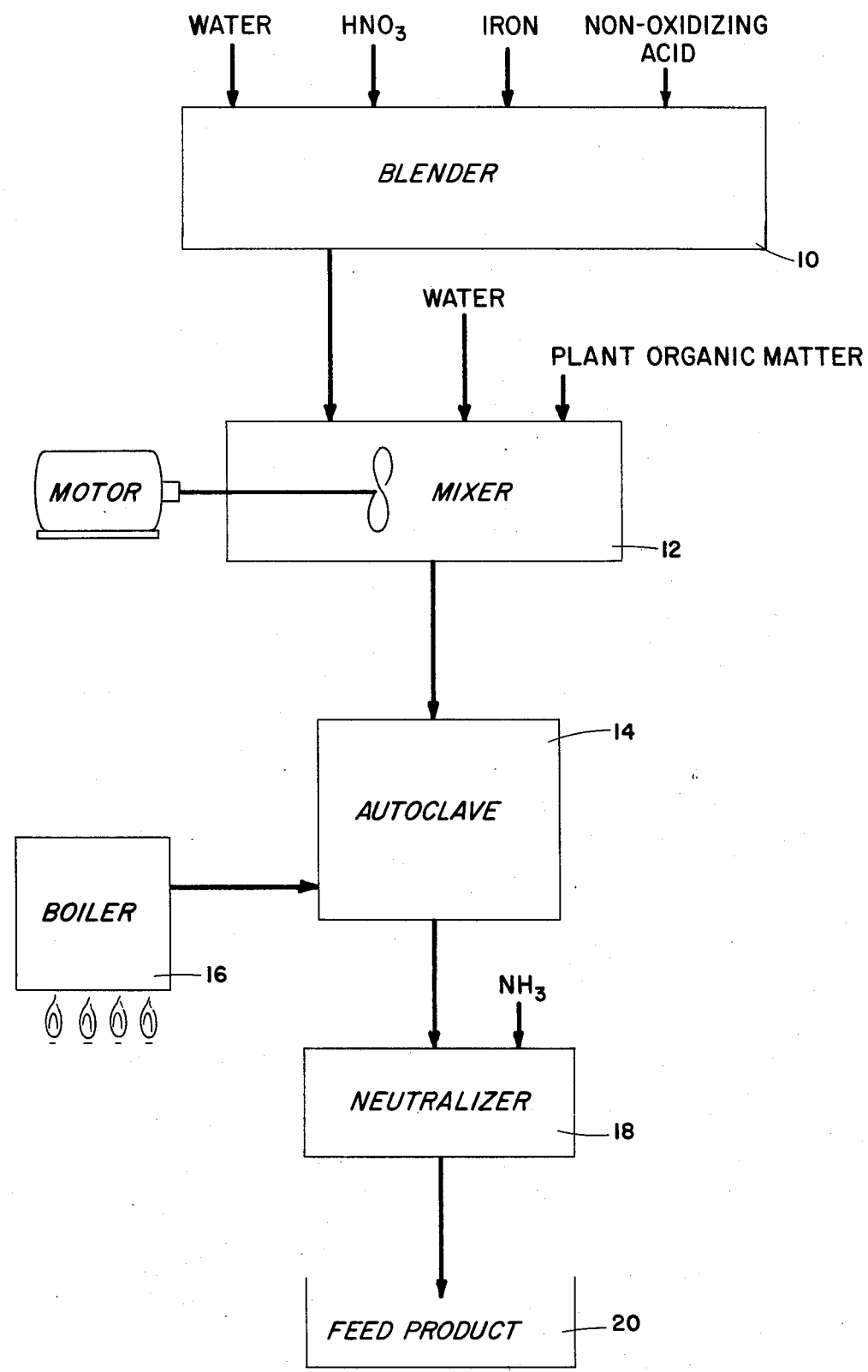

PROCESS OF INCREASING THE DIGESTABILITY OF CELLULOSIC MATERIAL USING NITRIC ACID

BACKGROUND AND OBJECTS OF THE INVENTION

The earth produces a great quantity of plant organic material having little use or value today. Substantially all plant organic material includes the combination of cellulose and lignin in various compositions and structural arrangements. Lignin is an amorphous polymeric substance normally necessary in a plant or parts of a plant requiring rigidity, such as in any plant having stems, branches or a trunk. The lignocellulose material is digestable at varying efficiencies by different animals. For instance, grass which has a low order of cellulose lignin bond, is readily digestably by ruminants. Humans, however, connot digest grass at a sufficiently high level to maintain body weight and therefore must depend upon a high order of digestable organic material, such as grain. Other animals, such as beavers, can successfully digest wood pulp material, like tree bark, at a sufficient rate to maintain growth whereas agricultural livestock such as cattle, sheep, horses and swine, cannot subsist on a diet of tree bark.

Even among agricultural animals the digestible systems vary to an extent wherein cattle can effectively utilize plant organic material having a lignin cellulose composition which will not be useful for swine.

The world today faces imminent famine. The human population has grown at such a rate that the grain producing potential of the world is being overtaxed. The diversion of grain to agricultural animals to produce meat results in a net calorie loss in terms of human food consumption. The impending famine exists in spite of a huge quantity of plant organic material in the forests and jungles of the world. If the digestability of plant organic material can be increased significantly the forests and jungles can produce sufficient food for the world's increasing population.

It is an object of this invention to provide a means of increasing the digestability of plant organic material by animals.

More particularly, an object of this invention is to provide a process of treating plant organic material to weaken at least part of the lignin-cellulose bond to expose increased portions of the cellulosic content to consumption by the digestive system of animals and to partially hydrolyze the exposed cellulose to its sugar monomers and to convert some of the sugars to their easily digested acids of oxidation.

Still more particularly, an object of this invention is to provide a process of treating cellulose bearing plant organic matter with nitric acid in a cooking process to break down the lignin-cellulose bond, thereby exposing the cellulosic component to digestable consumption by agricultural animals.

These general objects, as well as other and more specific objects of the invention will be fulfilled in the following description and claims, taken in conjunction with the attached drawing.

DESCRIPTION OF THE DRAWING

The drawing is a diagrammatic illustration of a process of practicing the invention to treat plant organic matter to increase the digestability by animals.

SUMMARY OF THE INVENTION

Briefly, the invention involves a process of treating plant organic matter to increase the digestability by animals including the steps of mixing finely divided plant organic matter with water, nitric acid, and a nonoxidizing acid such as sulfuric, phosphoric, hydrochloric or acetic acid, to provide a mixture having the composition of about 20 to 50% water, ¼ to 1% oxygen on the basis of oven dried organic matter and the balance of plant organic material, the mixture having a pH of from 1 to 3, the pH being achieved by adjusting the percent of nitric acid and nonoxidizing acid according to the natural acidity of the plant organic material being utilized, and cooking the mixture in an autoclave, such as by the use of steam, at about 100 to 125 psig for a period of 30 to 60 minutes, the cooking time depends upon the nature of plant organic material being utilized and the stability of the lignin-cellulose bond of the raw material. Iron may be added to the mixture before cooking, as a catalyst, to prevent the appearance of free nitrates in the processed material. The cooked material may then be neutralized to achieve the desired pH for animal feed, such as from 4 to 7. The processed material may then be fed to animals directly or, preferably, utilized in conjunction with other animal feed, such as grain, hay, silage, seed meals or grass to provide balanced nutrients for animal growth.

DETAILED DESCRIPTION

The drawing illustrates a method of practicing the steps of the invention. A homogeneous mixture is first prepared in a blender 10 by mixing together water, nitric acid, iron when required and a nonoxidizing acid. The function of the nitric acid in the process is to provide a source of oxygen for oxidizing the plant organic matter.

When processing old wood material or wood material having a low level of digestability, it is frequently necessary to add iron as a catalyst. To establish the desired formulation for any given raw material the process is first practiced without the iron catalyst. The resulting material is then tested. If deleterious quantities of free nitrates are found iron should be added. Iron, when used, functions to break down the nitric acid to release the oxygen in the mixture and to otherwise catalyze the oxidation process. Normally, if the raw material is fresh wood material or straw, no iron catalyst is required, however, if the raw material is sawdust from older trees or material from trees of a type having very low inherent digestability an iron catalyst is required. The nonoxidizing acid, such as sulfuric, phosphoric, hydrochloric of acetic is added. The mixture is then combined with the plant organic matter and water in a mixer to thoroughly wet the plant organic matter with the blended material.

The plant organic matter to be effectively treated must be broken into small components or chips if it is not already in such condition in its raw material state. Sawdust, such as generated by saw mills, is in an ideal condition for utilization in the process without further physical treatment. Wood chips, such as bark from lumber operations need to be broken into smaller components by grinding. Rice hulls do not need to be further treated but bagasse, wheat or oat straw, or other such material needs to be broken into bits. Generally, discrete particles of not more than ¼ inch diameter are acceptable for utilization in the process. Obviously, the coarser the components the longer the treating times required and, inversely, the finer the components the shorter the treating time required. The cooking process to be described later is somewhat dependent upon the coarseness of the plant organic matter, as well as other chemical factors.

The mixture from the blender 10 is deposited in a mixer 12 along with the plant organic matter and sufficient additional water is added so that the total composition in the mixer isabout 20 to 50% water. This composition should have a pH of from 0.5 to 3.5 and an oxygen level of from $\frac{1}{4}$ to over 1% by weight of the plant organic material, the oxygen being derived from the nitric acid. A range of 1 to 15 grams of nitric acid per pound of dry weight of cellulosic material will provide the required pH of the mixture and oxygen level.

The material from the mixer 12 is then deposited into an autoclave 14 where it is subjected to steam from boiler 16 to increase the pressure to about 100 to 125 psig, producing a temperature of about 178° C. The material is maintained at this pressure and temperature for a period of 30 minutes to 1 hour, the actual time required being dependent upon the chemical composition of the material being treated, particularly the strength of the lignin-cellulose bond as well as the coarseness of the material as previously indicated. In the cooking process which takes place in the autoclave 14 the material is first oxidized by reaction with the oxygen release from the nitric acid and then hydrolyzed by the reaction of water with the oxidized products at the elevated pressures and temperatures in the autoclave.

After the cooking process has been completed in the autoclave, the reacted products are discharged. Normally, these products will have a pH of 1 to 4, depending upon the particular type of organic plant material. It is usually desirable to increase the pH of the mixture in neutralizer 18 or while in the autoclave 14. This step may be achieved by adding ammonia to the processed material. It is normally desired to raise the pH of the processed material to a level of between 4.0 and 7 for most effective utilization as animal feed. Thereafter, the treated material is discharged into storage bin 20 for use. The product can be dried if it is to be kept for extended periods. The processed material may be fed directly to livestock, or it is preferably combined with other feed products, including grain, hay, urea, etc., or a combination of these, to provide a balanced nutritional feed for livestock.

As a specific example of the application of this invention illustrating the ratios of material utilized, hardwood sawdust as a byproduct of the lumber industry was used as the raw material. Nitric acid at 42° Be. (67.18% $HNO_3$), sp. gr. 1,4078, is utilized in a concentration of 9 ml. per pound of oven dried wood sawdust, or approximately 2.8% 42° Be. nitric acid per pound of wood treated.

Iron is added for example in the form of unalloyed carbon steel, such as bailing wire in an amount corresponding to 0 to 0.5 grams per pound of oven dried sawdust treated with 0.20 grams per pound being typical, that is, approximately 0.044% iron on the basis of oven dried sawdust. The nitric acid and iron are mixed with a small quantity of water to maintain a concentration sufficient to react the nitric acid with the iron to dissolve the iron. In treating oak tree sawdust it will not normally be necessary to add any nonoxidizing acid, however, whether such is required or not will depend upon the characteristics of the mixed material which the operator will discern by measuring the oxidation/reduction potential and pH of the mixed material before autoclaving.

The solution of acid, iron and water is then thoroughly mixed with the sawdust and additional water added so that the total mixture is approximately 20 to 50% water.

The mixture is then placed in an autoclave and steam is introduced to bring the pressure up to 100 to 125 psig (168° to 178° C.). The pressure is maintained for approximately 30 to 60 minutes with 45 minutes being typical when treating finely ground oak sawdust. An experienced operator will discern that the end of the cooking process is indicated in that after the mixture has reached the maximum temperature and held at a pressure of 100 to 125 psi, it will be observed that the temperature will drop approximately 5° C. when the oxidation and hydrolysis have concluded.

In addition, if any small leakage of gases occurs from the autoclave, the experienced operator will detect a distinctive odor which changes materially when the cooking process is completed. One completion of the process the material may then be discharged from the autoclave, regardless of the amount of time required. However, it has been found that approximately 30 minutes to 1 hour is the time required to complete the oxidation and hydrolysis reactions in the autoclave.

Thereafter the autoclave may be blown down and the feed material removed. If desired it may then be neutralized by the addition of ammonia or other nontoxic base. Thereafter, the product is ready to feed directly livestock, dried, and or packaged for shipment, or mixed with other feed materials as previously discussed.

Utilizing the above described rtios, the material employed for processing a 10,000 pound dry weight batch of cellulosic material is as follows: 13,330 pounds of process material (25% moisture); 279 pounds of 42° Be. $HNO_3$; and 4.4 lbs. of iron as a catalyst.

As previously stated, some types of wood, such as hickory, have a low degree of acidity, and when the same percentage of nitric acid is utilized as in the above example, the pH level would be too high. Therefore, in order to maintain the proper pH required for the oxidation and hydrolysis steps, it is necessary to lower the pH to an acceptable level so that a reaction is achieved to break down the lignin-cellulose bond and hydrolyze the cellulose. For this reason a nonoxidizing acid is added to the nitric acid. Any nontoxic nonoxidizing acid can be employed, however, sulfuric, phosphoric, hydrochloric or acetic are preferred because of their availability and economy. Sulfuric and phosphoric acids are desirable because of their nutritionally desirable derivatives. This is particularly true when phosphoric acid is utilized.

For any given raw cellulose bearing raw material the ratio of nitric acid to nonoxidizing acid can be ascertained in the following manner. First, process a number of batches of the raw material utilizing varying amounts of nitric acid alone, with an iron catalyst if necessary to remove excess free nitrates in the treated material. The pH of each batch is checked and recorded before it is placed in the autoclave. Second, yeast digestability tests are conducted with samples of each finished product to determine which batch shows the best yeast digestability. This indicates the optimum amount of nitric acid for the given raw material. Yeast digestability testing is employed because it is expeditious and inexpensive, does not require complex analytical apparatus, and is a good method of indicating the amounts of sugar and sugar equivalents which have been made available from the cooking process. Third, if the pH produced by this selected level of nitric acid in the mixture before cooking is less than 3, add sufficient nonoxidizingacid to reduce the pH to between 1 and 3. It will be found that by use of the additional nonoxidizing acid to bring the pH to the preferred level of between 1 and 3, that the yeast digestability of the finished product will be increased. Some raw material which is normally acidic, such as most oak sawdust, will not require the addition of any or at least a lesser amount of nonoxidizing acid.

The methods of this invention produce significant improvements in the chemical composition of the treated material compared to the raw material. As an example, oak wood sawdust was found to have the following analysis:

| Ammonia | 0.28 |
| Protein | 1.44% |
| Oil (or Fat) | 0.60% |
| Moisture | 9.8% |
| Crude Fiber | 55.2% |
| Ash | 1.2% |
| NFE | 31.76% |
| TC | 86.96% |

The same oak wood sawdust was treated according to the method herein described and the dried finished product was found to have the following analysis:

| Ammonia | 0.30% |
| Protein | 1.54% |
| Oil (or Fat) | 0.48% |
| Moisture | 4.5% |
| Crude Fiber | 27.4% |
| Ash | 1.05% |
| NFE | 65.03% |
| TC | 92.43% |

In each analysis "NFE" stands for "nitrogen free extract" and "TC" for "total carbohydrates."

In another comparison, untreated hickory sawdust had the following analysis:

| Ammonia | 0.20% |
| Protein | 1.03% |
| Oil (or Fat) | 0.44% |
| Moisture | 8.4 % |
| Crude Fiber | 58.8 % |
| Ash | 0.60% |
| NFE | 30.73% |
| TC | 89.53% |

Composition of the dried processed hickory was as follows:

| Ammonia | 0.23% |
| Protein | 1.18% |
| Oil (or Fat) | 0.41% |
| Moisture | 2.3% |
| Crude Fiber | 32.4% |
| Ash | 1.9% |
| NFE | 61.81% |
| TC | 94.21% |

It can be seen that the treated material in both instances is significantly lower in crude fiber and significantly higher in NFE and TC.

These samples of raw material had a lower than normal water content since they were kept in open containers prior to analysis. Most fresh sawdust has a water content of approximately 25%, although the level can vary greatly according to the type of wood, the time of year the tree is cut and the amount of drying which has taken place from the time the tree is cut until the sawing operation producing the sawdust.

Tests have been conducted to determine the digestability of cellulosic material treated according to the herein described process at Oklahoma State University: Sheep were fed a ration including processed wood. The raw material was gathered from limbs and trees cut in clearing along power line conductors, which consisted primarily of oak, elm, hickory and cottonwood. Digestability was determined by weighing feed input and subtracting feces weight using techniques long recognized as a means of ascertaining digestability. The results showed digestability of wood material processed by the methods described herein to be between 57.7% and 80.1%. No tests of digestability were made of the unprocessed raw material, however a pamphlet published in 1975 by the U.S. Government Printing Office entitled "Wood and Wood-based Residues in Animal Feeds," at page 78 lists the normal digestability of Red Oak as 3%, White Oak as 4%, Eastern Cottonwood at 4%, American Elm as 8% and Shagbark Hickory as 5%.

The treating process described herein increases the digestability in two basic ways. First, a portion of the cellulosic material is converted to sugar and sugar equivalents. Second, cellulose-lignin bonds are broken, making more of the cellulose available for digestive action in the animal.

Cellulose material processed in the manner herein described is best used in the formulation of animal feed. Processed wood alone is not desirable as animal feed; although it is high in carbohydrates it is deficient in protein and vitamins.

A balanced ration which has been found to be not only nutritionally correct but palatable to both diary and beef cattle is as follows:
100 lbs. Processed Wood
100 lbs. Corn
20 lbs. Soy Bean Meal
3 lbs. Urea
Vitamins A, D, E and trace mineral supplement The composition of animal feed can vary greatly with the goal being balanced nutrition and palatability achieved at a minimum cost. The type animal to be fed requires different compositions with rumens normally being able to utilize a higher percentage of treated cellulosic material than non-rumens.

There are three basic advantages of the processed wood in an animal ration. First, the availability of cellulosic material as an animal food is practically unlimited in many parts of the world, compared to the limited amount of arable land. Second, the processed cellulosic material is much cheaper than grain, hay or other sources of carbohydrates for animal feed. Third, the processed cellulosic material seems to have improved palatability compared to many types of animal feed. Beef and dairy cattle introduced to rations including processed cellulosic material have increased consumption, resulting in higher rates of weight gain and milk production.

Iron catalyst is used to prevent the appearance of excessive free nitrates in the processed material. When fresh wood is the raw material it is normally readily reactable with the dilute nitric acid, and organic acid when used and little nitrate production results. However, when the raw material has the cellulose more firmly bound to the lignin content or otherwise has a lower reduction potential, iron is used to introduce instability of the nitrates. Concentrated nitrates in an animal ration can be lethal and a nitrate level under 100 parts per million is normally desired. A deleterious level of nitrates in animal feed is any level which retards growth rate or milk production or reduces the healthfulness of the animal. This level varies with different species and the deleterious nitrate level for different species and age of animals may be determined by reference to publications of the U.S. Department of Agriculture.

While the invention has been described with a certain degree of particularity it is manifest that many changes may be made in the details of practicing the process and the sequence of steps without departing from the spirit of this disclosure. It is understood that the invention is not limited to the embodiment set forth herein for purposes of exemplification, but is to be limited only by the scope of the attached claim or claims, including the fully range of equivalency to which each step thereof is entitled.

What is claimed:

1. A process of treating cellulosic plant material to increase the digestability thereof by animals comprising:
    chopping the cellulosic plant material into particles;
    mixing the chopped cellulose material with water to thoroughly wet the same;
    mixing nitric acid with the wet cellulosic material to reduce the pH of the mixture to 0.5 to 3.5; and
    cooking the mixture at about 100 to 125 psig steam pressure for about 30 to 60 minutes to break lignin cellulose bonds and to convert at least a portion of the cellulose for use as a digestible material suitable as animal feed.

2. A process of treating cellulosic plant material according to claim 1 wherein the amount of nitric acid is equal to about 1 to 15 grams per pound of dry cellulosic material.

3. A process of treating cellulosic plant material according to claim 1 including adding iron as a catalyst in the mixture before cooking.

4. A process of treating cellulosic plant material according to claim 3 wherein the amount of iron is equal to about 0 to 0.5 grams per pound of dry cellulosic material.

5. A process of treating cellulosic matter according to claim 1 including the step of adding iron as a catalyst to the mixture before cooking, the amount of iron being added being sufficient to prevent the appearance of deleterious amounts of free nitrates in the processed material.

6. A process of treating cellulosic plant material according to claim 1 wherein the cooking step is carried out at about 125 psig steam pressure for about 45 minutes.

7. A process of treating cellulosic plant material according to claim 1 including:
    neutralizing the cooked product.

8. A process of treating cellulosic plant material according to claim 7 wherein the neutralizing step is carried out utilizing ammonia.

9. A process of treating cellulosic plant material according to claim 7 wherein the pH of the cooked product is adjusted to about 4.0 to about 7.

10. A process of treating cellulosic plant material according to claim 1 including mixing a nontoxic nonoxidizing acid with the wet cellulosic material before cooking so that the mixture has a pH in the range of about 1 to 3.

11. A process of treating cellulosic plant material according to claim 10 wherein the nonoxidizing acid is selected from the group consisting of phosphoric, hydrochloric, sulfuric and acetic.

12. A process of treating cellulosic plant material to increase the digestability thereof by animals, comprising:
    1. chopping the cellulosic plant material into particles;
    2. mixing the chopped cellulose plant material with water and nitric acid, the total water content of the mixture being about 25% of the dry weight of said plant material;
    3. cooking the mixture at about 100 to 125 psig at a temperature of about 168° to 178° C for about 30 to 60 minutes;
    4. conducting a yeast growth test of the processed material to obtain an indication of digestability;
    5. repeating steps (1) through (4) while varying the amount of nitric acid to ascertain the concentration which produces the maximum yeast growth in the processed material;
    6. determining the pH of the mixture of step (2) which produces the maximum yeast growth as determined in step (5);
    7. repeating steps (1through (3) utilizing the amount of nitric acid which produces the maximum yeast growth as determined by step (5) and adding to step (2) sufficient nontoxic nonoxidizing acid to lower the pH of the mixture before cooking to about 1 to 3.

13. A process of treating cellulosic plant material according to claim 12 including the step of:
    analyzing the treated product of step (7) to ascertain the presence of deleterious amounts of free nitrates; and
    adding an iron catalyst to step (2) in an amount sufficient to reduce the amount of free nitrates in the treated product below a deleterious level.

14. A process of treating cellulosic plant material according to claim 12 wherein the nontoxic nonoxidizing acid of step (7) is selected from the group consisting of phosphoric, hydrochloric, sulfuric and acetic.

15. A process of treating cellulosic plant material according to claim 12 including the step of:
    neutralizing the treated material from step (7) with ammonia to raise the pH to between 4.0 and 7.

* * * * *